United States Patent [19]
Johnson et al.

[11] Patent Number: 5,791,792
[45] Date of Patent: Aug. 11, 1998

[54] IDEOGRAPHIC TYPEWRITER AND METHOD

[76] Inventors: Reynold B. Johnson, 548 E. Crescent Dr., Palo Alto, Calif. 94301; Kenneth Alan Fesler, Box 7286, Stanford, Calif. 94309; Eugene W. Weber, 334 Avila Rd., San Mateo, Calif. 94402

[21] Appl. No.: 80,689

[22] Filed: Jun. 22, 1993

Related U.S. Application Data

[63] Continuation of Ser. No. 669,066, Mar. 12, 1991, abandoned.

[51] Int. Cl.⁶ .................................................. B41J 5/00
[52] U.S. Cl. ........................ 400/110; 400/472; 400/484; 400/716
[58] Field of Search .......................... 400/86, 109, 110, 400/111, 119, 165.1, 173, 477, 479, 479.2, 484, 703, 705, 716; 358/475, 484, 497; 382/65–68, 58, 13; 395/155

[56] References Cited

U.S. PATENT DOCUMENTS

| | | | |
|---|---|---|---|
| 4,317,137 | 2/1982 | Tompkins | 358/484 |
| 4,451,895 | 5/1984 | Sliwkowski | 395/155 |
| 4,626,925 | 12/1986 | Toyoda | 382/59 |
| 4,722,621 | 2/1988 | Johnson | 400/110 |
| 4,758,952 | 7/1988 | Harris, Jr. et al. | 101/487 |
| 4,899,228 | 2/1990 | Sano et al. | 358/497 |
| 4,926,010 | 5/1990 | Citron | 340/711 |
| 4,954,914 | 9/1990 | Karita et al. | 358/475 |
| 4,987,499 | 1/1991 | Kimura | 358/475 |
| 5,051,736 | 9/1991 | Bennett et al. | 382/13 |
| 5,067,028 | 11/1991 | Ogura et al. | 358/497 |

*Primary Examiner*—Ren Yan
*Attorney, Agent, or Firm*—Flehr Hobbach Test Albritton & Herbert LLP

[57] ABSTRACT

Ideographic typewriter and method in which a set of characters are printed on a keyboard panel in optically readable form and scanned to provide a bit map of a character which is to be printed. A printer is actuated in accordance with the bit map to form an image of the selected character on an output medium. Characters beyond those included in the set printed on the keyboard panel can be written on a calligraphy pad near the keyboard and scanned to provide bit maps for use in the printing of those characters. Information associated with the characters is prerecorded in tracks on a magnetic medium positioned beneath the keyboard panel and transduced in a manner which substantially eliminates crosstalk between the tracks.

60 Claims, 5 Drawing Sheets

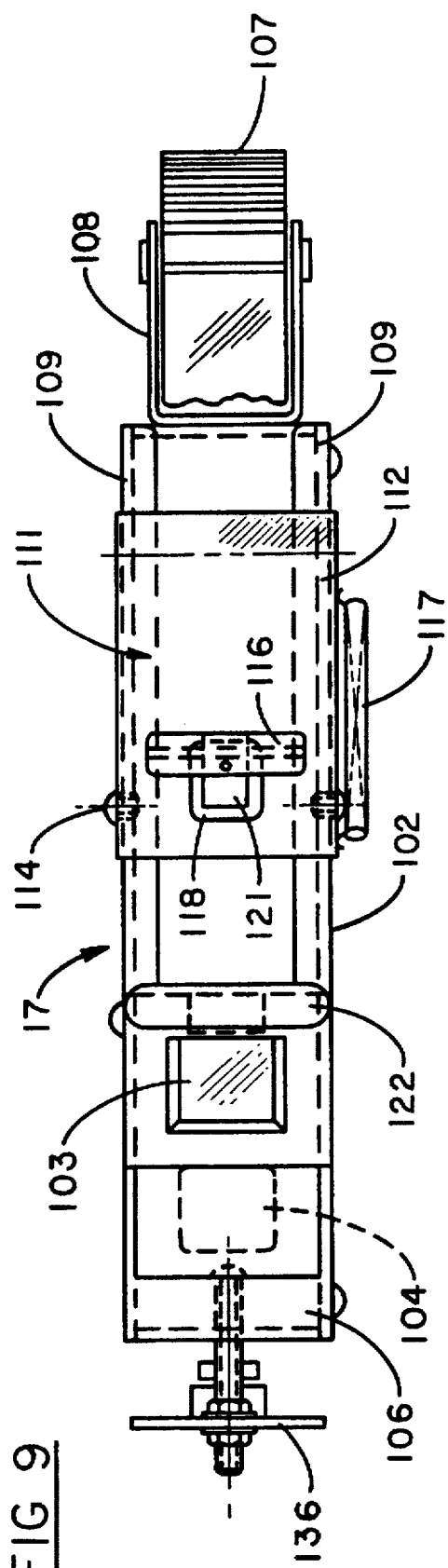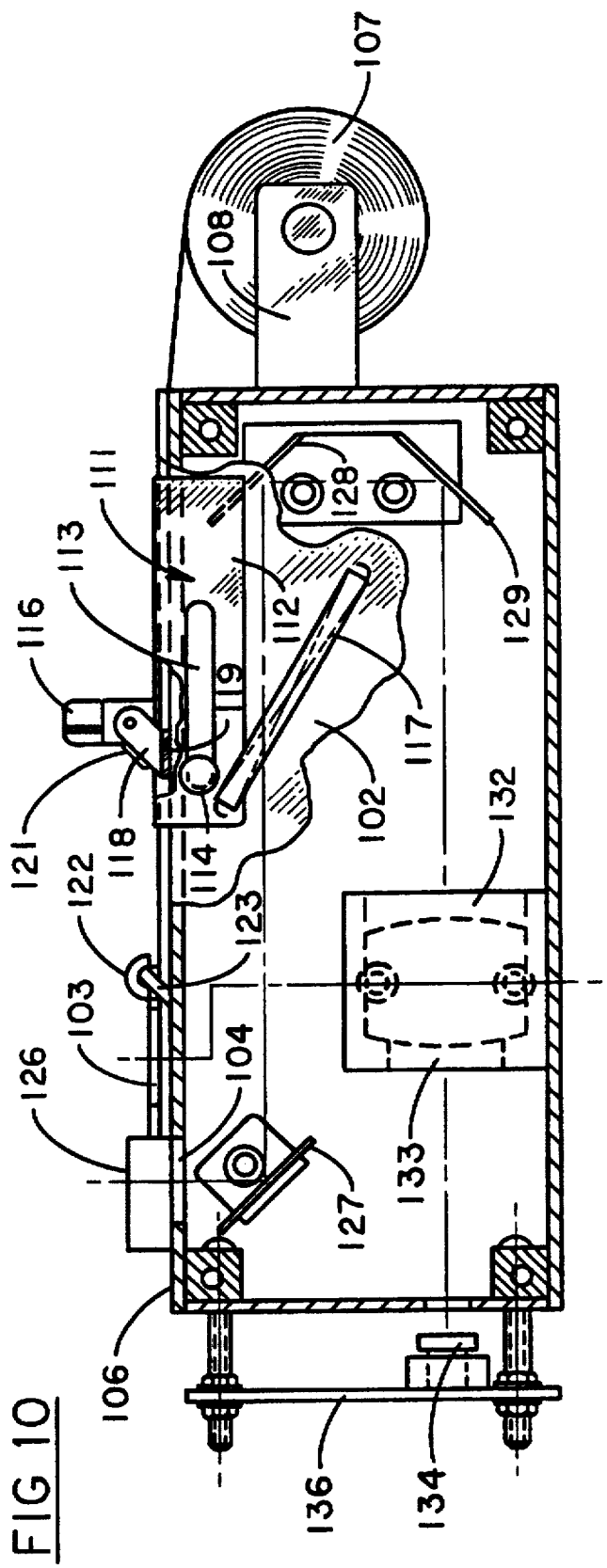

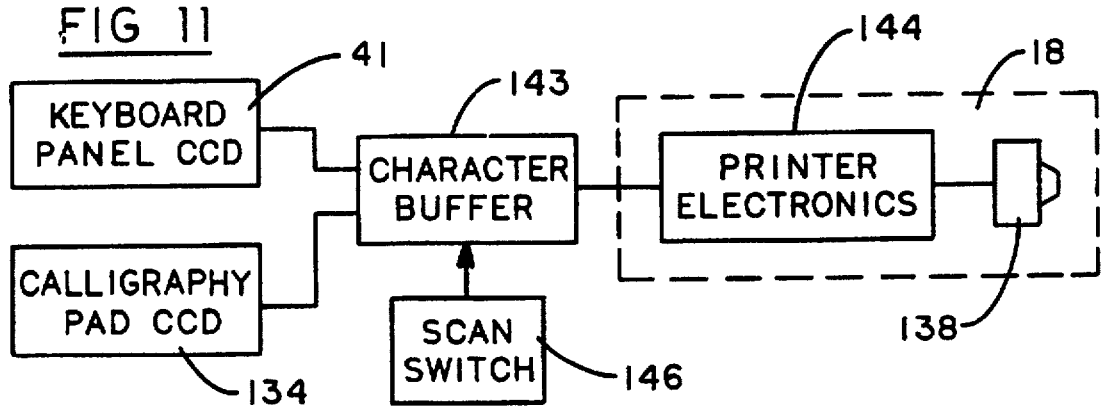
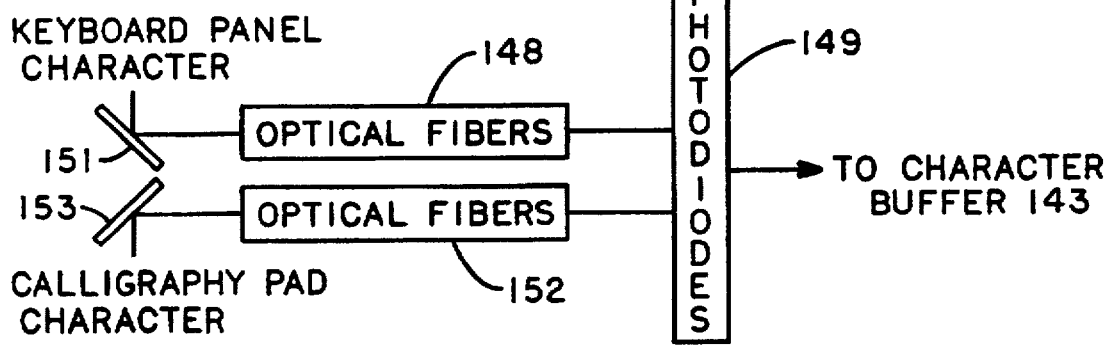
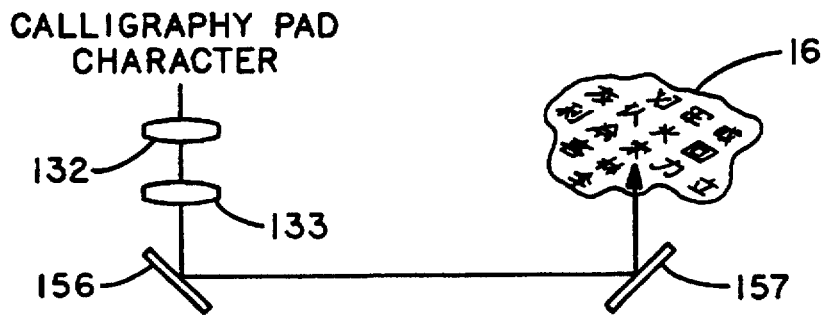
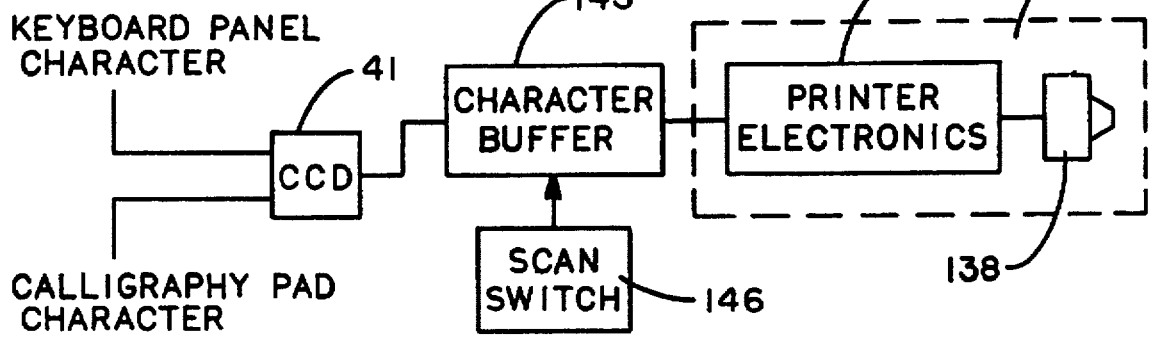

IDEOGRAPHIC TYPEWRITER AND METHOD

This is a continuation of application Ser. No. 07/669,066 filed Mar. 12, 1991 now abandoned.

This invention pertains generally to typewriting and printing devices and, more particularly, to a typewriter and method which are particularly useful in the printing of Chinese ideographs and other characters selected from sets of virtually unlimited size.

As used herein, the term "character" is used in its broadest sense and encompasses all forms of graphic representations including but not limited to letters, numbers, symbols, ideograms, icons, pictures and other images.

In the Chinese language, there are approximately 40,000 ideographs or characters, of which about 2500–3000 are in common use. A typewriter for the Chinese language must, therefore, be capable of printing on the order of at least 2500–3000 characters.

One type of Chinese typewriter heretofore provided has separate printing elements for the most commonly used characters arranged in a matrix, with a stylus by which the element for a desired character is picked up and moved into position for printing. When uncommon characters are required, they must be individually selected from a separate tray and moved into position for use. This is a time consuming process, and a skilled operator can only print about ten characters with such a machine.

Another technique which has been employed in Chinese typewriters is to store data for the various characters in the memory of a computer and to address this information to control the operation of a printer. This technique requires a substantial amount of memory to store the data for a large set, and the characters which can be printed is limited to those for which data has been stored.

U.S. Pat. No. 4,722,621 describes a keyboard assembly and typewriter in which a relatively large number of characters are arranged in an array on a keyboard panel, with a character selector which is moved manually about the array of characters and linked to a group of daisy wheel printing elements to effect printing of a desired character. This patent also describes the use of a magnetic medium which is transduced in accordance with the position of the character selector to provide an audible pronunciation of the selected character or to provide information for addressing a data store to obtain a description of the character.

It is in general an object of the invention to provide a new and improved ideographic typewriter and method.

Another object of the invention is to provide an ideographic typewriter and method of the above character which are particularly suitable for printing Chinese ideographs and other characters selected from sets of relatively large size.

Another object of the invention is to provide an ideographic typewriter and method of the above character which can print characters at a faster rate than Chinese typewriters heretofore provided.

Another object of the invention is to provide an ideographic typewriter and method of the above character which can be implemented relatively inexpensively.

These and other objects are achieved in accordance with the invention by printing a set of characters on a keyboard panel in optically readable form, scanning a selected one of the printed characters to provide a bit map of the character, and printing a visual image of the selected character in accordance with the bit map. Characters beyond those included in the set printed on the keyboard panel can be written on a calligraphy pad near the keyboard and scanned to provide bit maps for use in the printing of those characters. Information associated with the characters is prerecorded in tracks on a magnetic medium positioned beneath the keyboard panel and transduced in a manner which substantially eliminates crosstalk between the tracks.

FIG. 9 is a fragmentary top plan view of the calligraphy pad in the embodiment of FIG. 1.

FIG. 10 is an elevational view, partly broken away, of the calligraphy pad in the embodiment of FIG. 1.

FIG. 11 is a simplified block diagram of the signal processing and printer control system in the embodiment of FIG. 1.

FIG. 12 is a schematic illustration of an alternate type of optical/scanner for use in the embodiment of FIG. 1.

FIG. 13 is a schematic illustration of an optical system which permits the use of a single scanner for reading characters from the keyboard panel and from the calligraphy pad in the embodiment of FIG. 1.

FIG. 14 is a simplified block diagram of a signal processing and printer control system for use with the optical system of FIG. 13.

Figure 1:
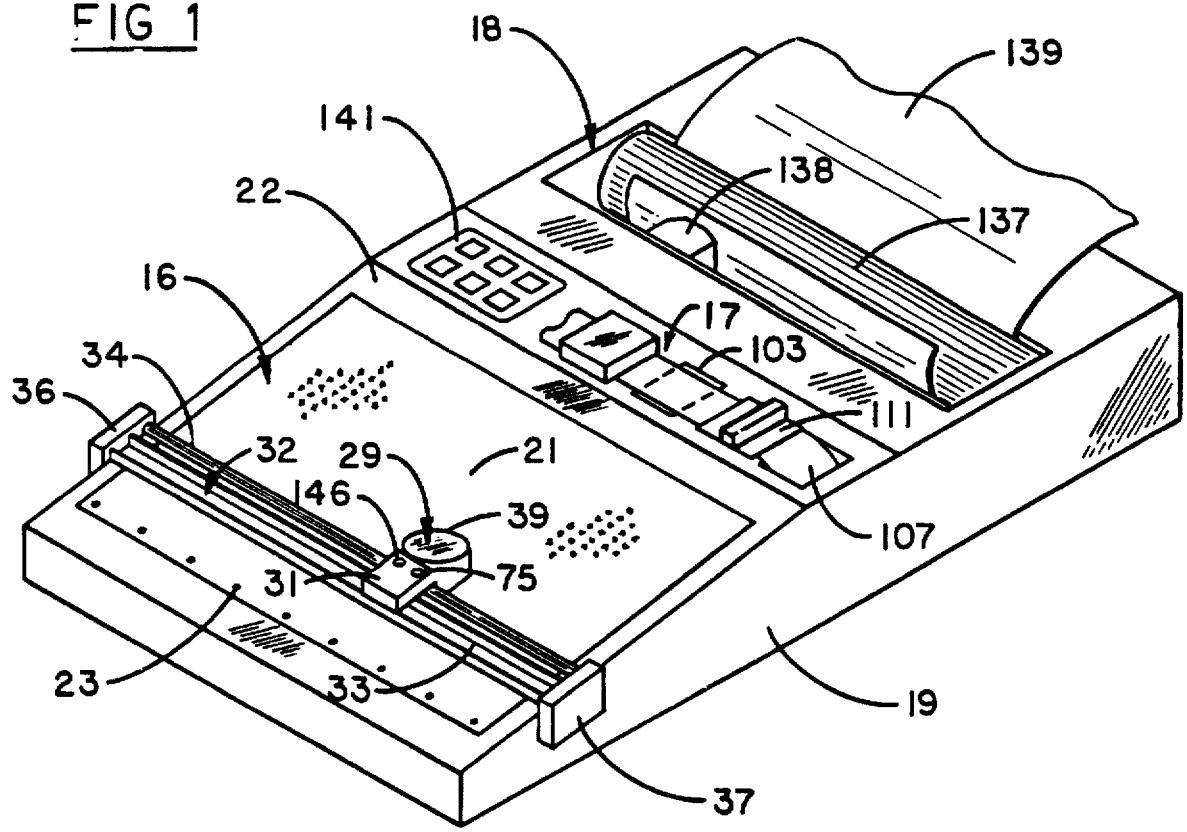
FIG. 1 is an isometric view of one embodiment of an ideographic typewriter according to the invention.
Figure 2:
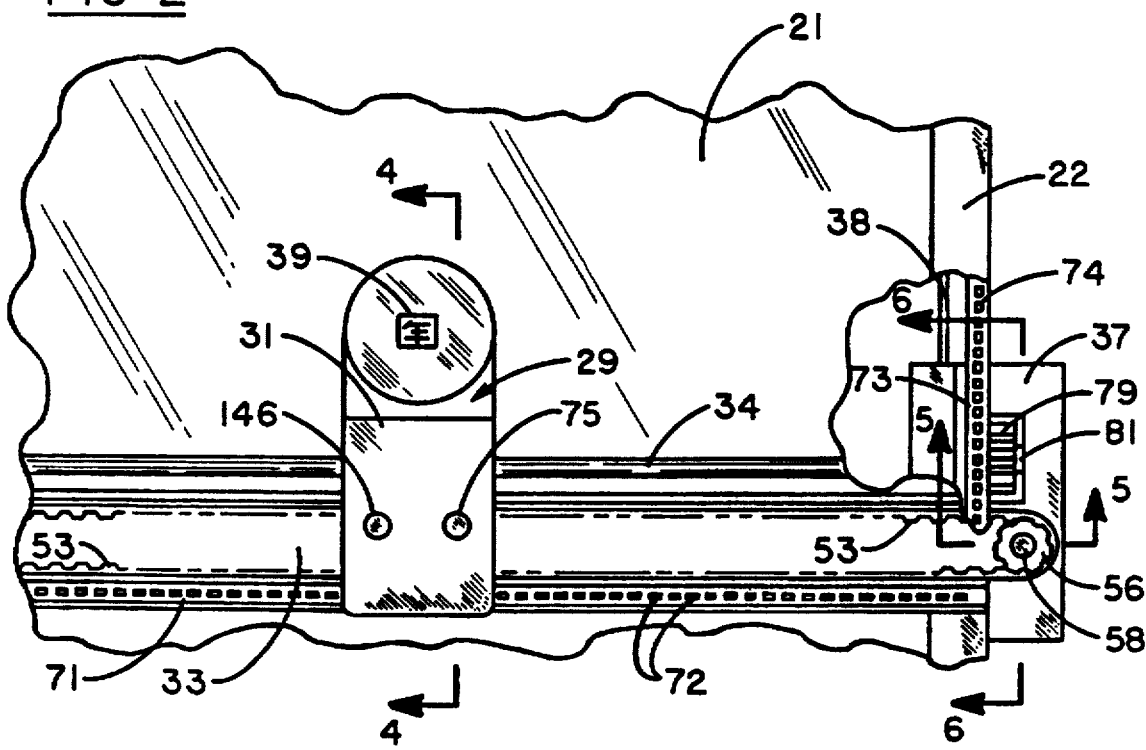
FIG. 2 is a fragmentary top plan view, partly broken away of the embodiment of FIG. 1.
Figure 3:
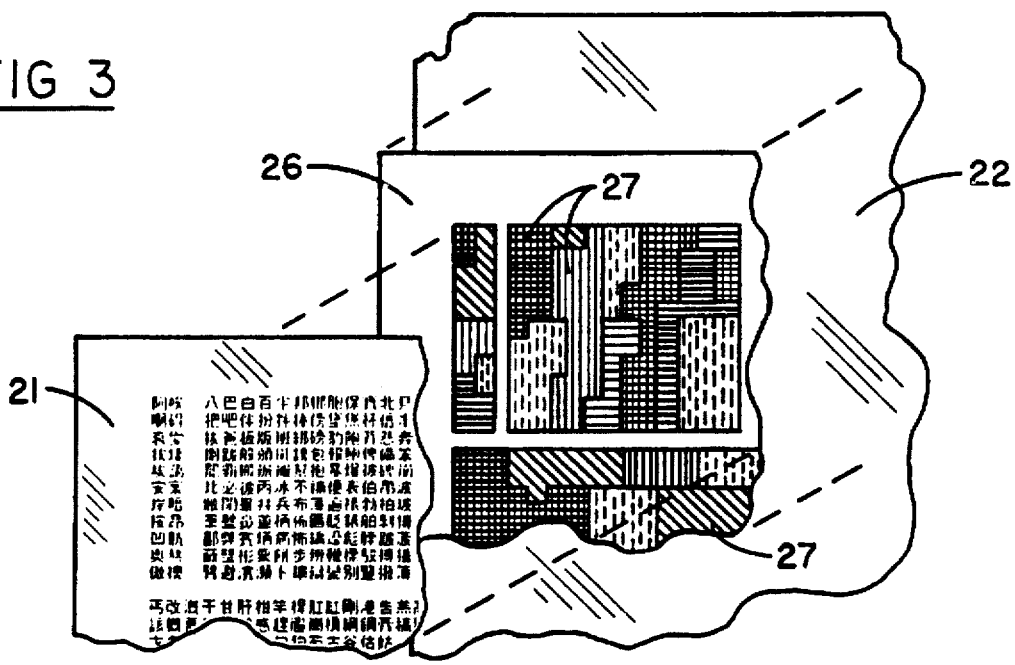
FIG. 3 is a fragmentary exploded plan view of the keyboard panel in the embodiment of FIG. 1.
Figure 4:
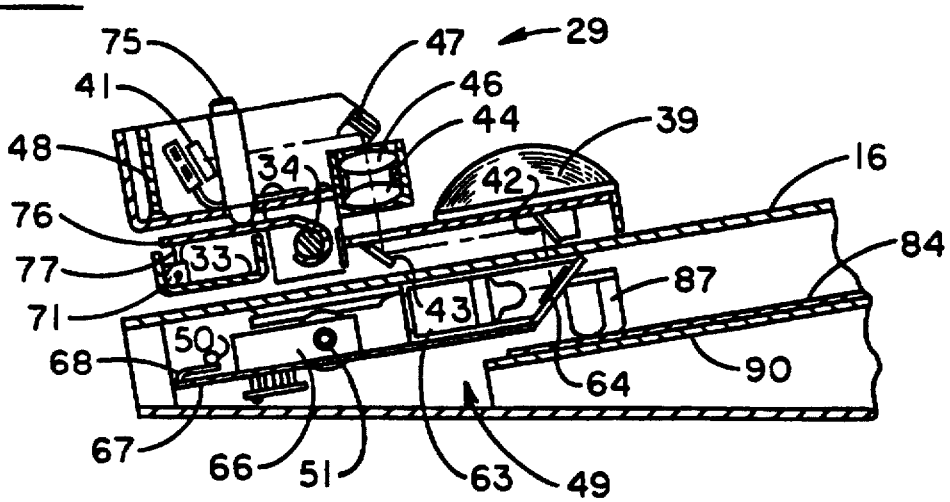
FIG. 4 is a cross sectional view taken along line 4—4 in FIG. 2.
Figure 5:
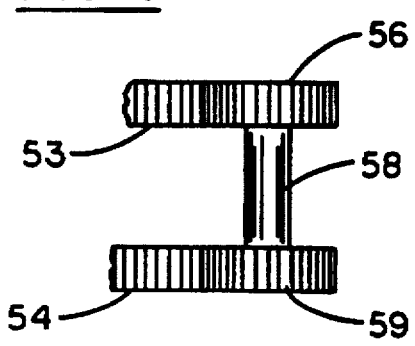
FIG. 5 is a cross sectional view taken along line 5—5 in FIG. 2.
Figure 6:
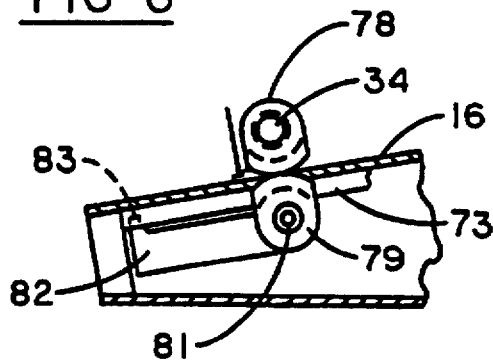
FIG. 6 is a cross sectional view taken along line 6—6 in FIG. 2.

As illustrated in the drawings, the typewriter includes a keyboard panel 16, a calligraphy pad 17 and a printer 18 mounted in a case or housing 19 of a size which is highly portable and readily transportable. An initial prototype of the embodiment shown in FIG. 1 has a height of about 3.5 inches, a width of about 14 inches and a length or depth of about 19 inches, and subsequent versions of the machine are expected to be even more compact than this.

On the keyboard panel, a set of characters is presented in an optically and visually readable form, i.e. by imprinting the characters on the panel in the same form in which they are to be printed on the output medium. The panel itself comprises a sheet or layer 21 of a transparent material such as an acrylic plastic upon which the characters are in a generally rectangular array. In one presently preferred, the characters are arranged in 80 vertically extending column and 40 horizontally extending rows on an 8.5 by 11 inch sheet, with each character being 0.125 inch square. As used herein, the terms "horizontal" and "vertical" are used with reference to the "x" and "y" directions on the keyboard panel rather than the terrestrial directions.

The character sheet is removably mounted on a sloping panel 22 on the typewriter cabinet in a manner which permits sheets containing different character sets to be readily interchanged. A plurality of registration pins 23 on panel 22 engage openings in the character sheet to hold the sheet in a predetermined position on the sloping panel. This panel is likewise fabricated of a light transmissive material such as a transparent or translucent plastic.

In the particular embodiment illustrated, the typewriter is intended for printing Chinese ideographs, and the character sheet contains approximately 3000 of the most common used ideographs or characters arranged in a manner designed to make it easy for a typist to find the desired characters. Thus, the characters are arranged in groups according to their initial consonant sounds, and within the groups, the characters are arranged by vowel sounds and the order of stroke complexity. A translucent underlay 26 is positioned beneath the character sheet and provided with areas of color 27 which are aligned with the different vowel sounds in the groups of characters. The arrangement of the characters in this manner and the color coding of the vowels gives the keyboard a "Gestalt" feel and makes it possible to locate a desired ideograph or character quickly and easily in a complex character set containing thousands of characters. The colored underlay has holes corresponding to the openings in the character sheet for engagement with the registration pins to hold the underlay in a predetermined position beneath the character sheet and thus maintain the colored areas in proper alignment with the characters.

A mouse assembly 29 is provided for selecting the characters to be printed by the typewriter from those imprinted upon the panel. The mouse assembly includes a mouse body 31 mounted on a carriage 32 for x-y movement relative to the keyboard panel. The carriage includes a rail 33 of u-shaped cross section and a shaft 34 on which the mouse body is mounted for movement across the keyboard panel in the horizontal or "x" direction. The end portions of the rail and shaft are supported by bearing blocks 36, 37 which are mounted on vertically extending rails 38 at the sides of the keyboard panel for movement in the vertical or "y" direction.

The mouse includes a magnifying lens 39 which is attached to the mouse body and provides an enlarged visual image of the characters beneath the lens to facilitate alignment of the mouse with a desired character.

The mouse also includes an optical scanner for reading the selected character and providing electrical signals which describe the character in bit map form. In the embodiment illustrated in FIG. 1, the scanner comprises a charge coupled device (CCD) 41 and an optical system for focusing light from the selected character on the keyboard panel to the CCD. The CCD has an array of light sensitive elements, e.g. a 40 by 60 element array, which are scanned electronically to provide the signals for the bit map.

The optical system includes a first mirror 42 positioned beneath the magnifying lens 39 for directing the light from the character toward a second mirror 43 which directs the light through a pair of focusing lenses 44, 46 to a third mirror 47 which directs the light onto the CCD. With the two dimensional CCD, the focusing lenses and the mirrors are all mounted on the mouse body in fixed positions relative to the path of light from the character to the CCD, and scanning is effected electronically. Circuitry associated with the CCD is mounted on a circuit board 48 inside the mouse.

If desired, other suitable light sensors can be utilized instead of the two dimensional CCD, in which case the scanning can be done manually. Other suitable sensors include photodiodes with optical fibers for directing light from the character to the photodiodes, or a linear or one dimensional CCD with a scanning mirror for directing light from successive portions of the character onto the light detecting elements.

The selected character is illuminated by a light source carried by a second mouse 49 located beneath the keyboard panel and constrained for movement with the upper mouse. The lower mouse is mounted on a pair of horizontally extending rods 50, 51 which extend between and are supported bearing blocks 36, 37 beneath the keyboard panel. Being affixed to the bearing blocks, these rods constrain the lower mouse for movement in the vertical direction in concert with the upper mouse. The lower mouse travels horizontally along its support rods and is connected to the upper mouse for horizontal movement in concert with the upper mouse by a pair of cogged belts 53, 54. Belt 53 is connected to the body of the upper mouse and is trained about a pair of notched pulleys or cog wheels 56 affixed to the upper ends of shafts 58 carried by bearing blocks 36, 37. Belt 54 is connected to the lower mouse and is trained about a pair of notched pulleys or cog wheels 59 affixed to the lower ends of shafts 58.

The light source carried by the lower mouse comprises a light emitting diode (LED) 63 and a mirror 64 positioned directly beneath mirror 42 for directing light from the LED through the selected character to mirror 42. In one presently preferred embodiment, support rods 50, 51 are fabricated of an electrically conductive material and are insulated electrically from each other for carrying an energizing current for the LED. In this regard, it will be noted that the lower mouse includes an insulative block 66 with a bore through which rod 50 passes and an electrically conductive contact or brush (not shown) in contact with the rod. The lower mouse also includes an elongated arm 67 of conductive material which extends beneath rod 51 and has an electrically conductive contact or brush 68 in contact with under side of that rod. Alternatively, if desired, the selected character can be illuminated by light from one or more LED's or other suitable light sources carried by the upper mouse, rather than with light from the under side of the panel.

A detent mechanism is provided for temporarily locking the upper mouse in a predetermined position relative to the keyboard panel, with the optical scanner in precise alignment with the position of the desired character on the panel. This means includes a horizontally extending detent bar 71 mounted on the carriage rail 33 and having one detent opening 72 for each column of characters on the keyboard panel. A similar bar 73 extends along the right hand side of the keyboard panel and has one detent opening 74 for each row of characters on the panel.

A manually operable detent button 75 is mounted on the mouse body for actuating the detent mechanism. This button bears upon a pivotally mounted arm 76 which has a detent pin 77 which moves into the opening in detent bar 71 with which it is aligned when the button is depressed, thereby locking the mouse in a horizontal position. Detent arm 76 is keyed to shaft 34 and causes the shaft to rotate as the button is depressed, although it is free to travel along the shaft with the mouse. A gear 78 affixed to shaft 34 meshes with a gear 79 on another shaft 81 carried by the bearing block 37, and a second detent arm 82 is affixed to this shaft. This arm carries a detent pin 83 which moves into an opening in detent bar 73 when the button is depressed, locking the mouse in a vertical position. A return spring (not shown) is included in the detent mechanism for retracting the pins from the detent openings when the button is released so the mouse will once again be free to be moved to another position. Since the lower mouse moves in concert with the upper mouse, it is likewise locked in position by the detent mechanism when the detent button is depressed.

Information associated with the characters on the keyboard panel is prerecorded on a magnetic medium 84 in the form of a generally planar sheet which is located beneath the keyboard panel in cabinet 19 and adapted to be transduced or read by a pair of transducer heads 86, 87 carried by the lower mouse. The arrangement of the medium and the heads is such that the information for a given character can be read when the character is selected by the upper mouse, and the information can be read either independently of or simultaneously with the scanning of the character on the keyboard panel. The information can be anything desired, such as a verbal pronunciation of the character, data for addressing a memory location containing a description of the character, or other data relating to the character.

Figure 7:
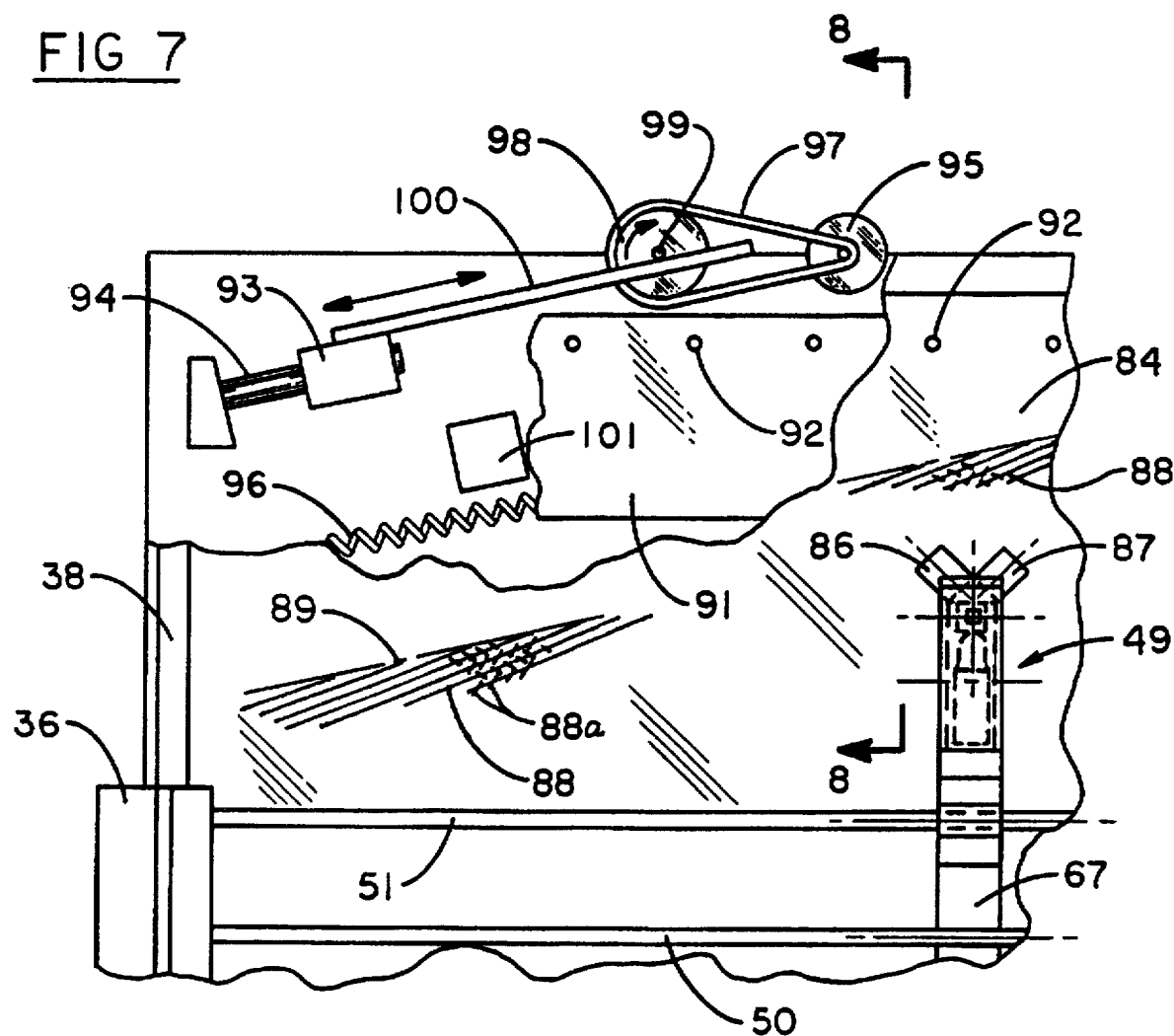
FIG. 7 is a fragmentary horizontal sectional view of the embodiment of FIG. 1.
Figure 8:
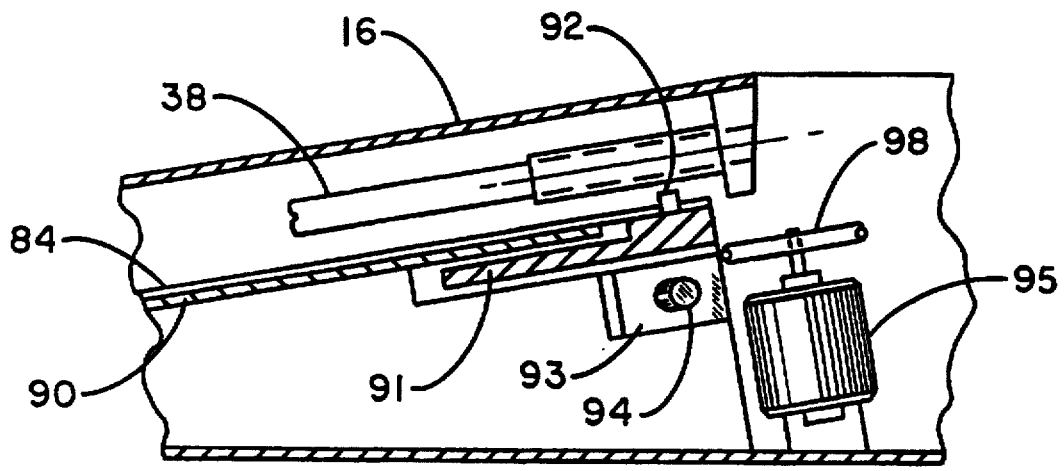
FIG. 8 is a cross sectional view taken along line 8—8 in FIG. 7.

As best seen in FIG. 7, the information is recorded in a herringbone pattern on the magnetic medium in a plurality of tracks 88 which extends at a small angle, e.g. 10 degrees, from a reference axis 89. In the embodiment illustrated, the tracks are spaced about 0.125 inch apart, and each track is about 0.75 inch long. The two heads transduce alternate tracks, and the gaps in the two heads are oriented at right angles to each other so the data in any given track has an orientation perpendicular to that of the information in the tracks adjacent to it, as illustrated by lines 88a. This has been found to be effective in preventing crosstalk between the information in adjacent tracks. In the event of physical interference which might prevent the heads from being centered directly over adjacent tracks, the two heads can be spaced any odd number of tracks apart and brought into alignment with adjacent tracks by repositioning the mouse.

The magnetic medium rests freely on the upper surface of a plate 90 which is spaced below and parallel to the keyboard panel. The rear portion of the medium is attached to a carriage 91 by registration pins 92 which engage openings in the medium. The carriage has a pair of bearing blocks 93 which are mounted on inclined shafts 94 for movement in a direction parallel to the reference axis and the centerline of the recording tracks to effect relative movement between the medium and the heads. The carriage is driven by a motor 95 and a spring 96. A drive belt 97 is trained about a small pulley on the motor shaft and a larger pulley 98 on a drive shaft 99. The drive shaft bears against the side of a drive rod 100 which is affixed to one of the bearing blocks on the carriage and extends in a direction parallel to inclined shafts 94. The motor rotates in a clockwise direction, as viewed from above, and drives the carriage and the magnetic medium toward the right as seen in FIG. 7. The spring drives the carriage toward the left at a rate controlled by a dashpot 101.

As best seen in FIGS. 9–10, calligraphy pad 17 comprises a generally rectangular light-tight housing 102, with a writing area 103 and a light transmissive window 104 on the upper wall 106 thereof. A roll of paper tape 107 is mounted on a bracket 108 outside one end of the housing, and tape from the roll is fed along the top wall of the housing past the writing area and window, with longitudinally extending edge guides 109 keeping the tape centered on the wall.

A manually operated paper feeding mechanism 111 is mounted on the housing for advancing the paper tape along the top wall toward the writing area and window in steps corresponding to the distance between the centerlines of the writing area and the window. This mechanism comprises a slider 112 having an inverted u-shaped cross section mounted on the upper portion of the housing, with guide slots 113 in the side flanges of the slider and guide pins 114 affixed to the side walls of the housing extending through the slots and constraining the slider for movement between advanced and retracted positions relative to the writing area and window. A knob 116 is affixed to the slider for moving the slider manually toward the advanced position, and a spring 117 urges the slider toward the retracted position. A shoe 118 having a rubber pad 119 on the lower side thereof is pivotally mounted on the slider and urged into engagement with the tape by a spring 121. The shoe extends downwardly and forwardly from the pivot point, and the rubber pad tends to grip the tape as the slider is advanced and to pass freely over the surface of the tape as the slider is retracted. Thus, the mechanism feeds the tape toward the writing area and window as the when the slider is advanced, but does not draw the tape back when the slider is retracted.

A snubber 122 is provided between the feeding mechanism and the writing area for holding the paper down in the writing area and preventing the paper from being withdrawn as the feeder is retracted. The snubber includes a downwardly and forwardly inclined rubber blade 123 which engages the paper to hold it down and prevent it from being withdrawn.

A light emitting diode or other suitable light source 126 is positioned above the transmissive window for illuminating characters which are written on the tape, and a mirror 127 is positioned directly beneath the window for directing light passing through the window toward a pair of mirrors 128, 129 which direct the light through a pair of focusing lenses 132, 133 to a CCD 134 similar to CCD 41. The lenses focus the light from the tape onto the CCD, and they also reduce the size of the image by a factor of four. Thus, in one presently preferred embodiment, the writing area is 0.5 inch square, and the image formed on the CCD is 0.125 inch square.

CCD 134 is scanned electronically to provide a bit map of the character written on the tape, and the CCD and the circuitry associated therewith are mounted on a circuit board 136 positioned outside the opposite end of the housing from the roll of tape. As is the case with CCD 41, other types of optical sensors can be utilized instead of a two dimensional CCD, if desired. Other suitable sensors include photodiodes in combination with optical fibers, and one dimensional arrays in combination with a scanning mirror for scanning the character to provide the data for a bit map.

Printer 18 is preferably of the type in which images are formed on the paper or other output medium as patterns of dots. Such printers include ink jet printers, laser printers, and what are commonly known as dot matrix printers. As used herein, the term "matrix printer" is used in a broad sense to designate any printer which produces an image in the form of a matrix or pattern of dots or other picture elements. The image can be formed thermally, by impact, or by any other suitable means, and in the presently preferred embodiment, the printer is a bubble jet printer.

The printer includes a platen or roller 137 and a print head 138 for forming images on a sheet of paper 139 which is trained about the platen in the conventional manner. The printer also has conventional mechanisms for rotating the platen and positioning the print head to form an image at a desired position on the paper, together with suitable circuitry for controlling the operation of these mechanisms and the operation of the print head to form the image. These elements are of conventional design, well known to those familiar with the art, and do not require further description at this point. In an initial prototype of the typewriter, the entire mechanism and circuitry from a commercially available bubble jet printer are utilized, and the control panel 141 from the printer is mounted on the upper wall of cabinet 19 for easy access by a person using the typewriter.

Referring now to FIG. 11, the bit map signals for the characters read from the keyboard panel and the calligraphy pad are stored temporarily in a character buffer 143 and applied to the control circuitry 144 for the printer. If the CCD's and the print head have similar arrays of sensing and printing elements, the bit map image from the CCD's can be printed directly by the printer. If the arrays have different numbers of elements, a microprocessor associated with the character buffer can convert the bit map to the size required by the printer. A pushbutton switch 146 is mounted on the upper mouse and connected to the control circuitry for initiating a scan of the CCD's and the printing of the selected character.

Operation and use of the typewriter, and therein the method of the invention, can be described briefly as follows. A character sheet 21 containing the desired character set is mounted on the keyboard panel, and a corresponding magnetic medium 84 is installed on carriage 91 beneath the keyboard panel. To print a character from the keyboard, the typist moves the upper mouse 29 into alignment with the desired character and depresses the detent button to lock the mouse in position. Being linked to the upper mouse, the lower mouse moves with the upper mouse and is likewise locked in position. With the character selected and the mice locked in position, the typist then depresses the button for switch 146 to initiate a scan of the character. The bit map of the character produced by the scan is stored temporarily and applied to the printer to form an image of the character on the paper in the printer.

If desired, the information recorded on the magnetic medium in association with the character can be transduced as the character is scanned, e.g. to provided a verbal pronunciation of the character as it is printed. Alternatively, the magnetically stored data can be read and utilized as desired without printing the character.

If the typist wants to print a character which is not found on the keyboard panel, he or she may do so by writing that character manually on the tape in the writing area 103 of the calligraphy pad. Once the character has been written, the tape is advanced by the typist to align the character with the window 104 where it is scanned to provide a bit map description of the character. This bit map is applied to the printer and utilized to form an image of the character on the output medium in the same manner as a bit map for a character on the keyboard panel. The character input through the calligraphy pad can be anything the typist may care to write or draw. This character is reduced in size by a factor of four by the lenses in the optical system of the calligraphy pad and is printed the same size as the characters from the keyboard panel.

As mentioned above, other types of scanners can be used instead of the CCD's, and one example of a system employing fiber optics and photodiodes is illustrated schematically in FIG. 12. In this example, a linear array of optical fibers 148 transmits light from a character on the keyboard panel to a linear array of photodiodes 149, and the optical system between the keyboard panel and the fibers includes a scanning mirror 151 by which scanning of the character is effected. A second linear array of optical fibers 152 transmits light from a character on the calligraphy pad to the array of photodiodes, with a scanning mirror 153 in the optical system of the calligraphy pad for scanning that character. The arrays of optical fibers and photodiodes can each include any desired number of elements, e.g. 24, and the fibers for the calligraphy pad can be larger than the fibers for the keyboard since the writing area on the calligraphy pad is larger than the characters on the keyboard. Rather than having a full matrix of printing elements, the print head can likewise have a linear array.

As illustrated in FIGS. 13–14, it is also possible to eliminate the CCD in the calligraphy pad and utilize a single CCD or other device for reading both the characters on the calligraphy pad and the characters on the keyboard. In the embodiment of FIGS. 13–14, the character on the calligraphy pad is projected onto an unused position on the keyboard panel and scanned by the CCD 41 in the keyboard mouse. In this embodiment, a mirror 156 directs the light from lenses 132, 133 through a window in the calligraphy pad housing to a mirror 157 positioned beneath the position on the keyboard panel where the character is to be projected. Mirror 157 directs the light to the desired position on the keyboard, and lenses 132, 133 focus it on the panel.

The invention has a number of important features and advantages. The data for the characters to be printed is stored on the keyboard, thereby avoiding the need for memory for storing descriptions of the characters. This permits a large number of characters to be stored inexpensively in a relatively small space, and a substantially unlimited number of characters can be printed by using interchangeable panels with different sets of characters printed on them. Additional characters can be written manually on the calligraphy pad and printed along with the characters from the keyboard. Information relating to the characters on the keyboard is recorded on a magnetic medium beneath the keyboard and can be transcribed concurrently with or independently of the scanning of the keyboard characters. Even complex ideographs are formed with a single keystroke, and the typewriter can print such characters at speeds of one character per second, or faster. In addition to being easy to use, the typewriter is inexpensive to manufacture and economical to own, and it is expected to appeal to vast numbers of students and other people who might otherwise not be able to afford such a typewriter.

It is apparent from the foregoing that a new and improved ideographic typewriter and method have been provided. While only certain presently preferred embodiments have been described in detail, as will be apparent to those familiar with the art, certain changes and modifications can be made without departing from the scope of the invention as defined by the following claims.

We claim:

1. In a typewriter: a keyboard panel having a plurality of characters printed thereon in optically readable form, a mouse movable about the keyboard panel and having means for visually aligning the mouse with a selected one of the printed characters, means for holding the mouse in a fixed position relative to the character with which it has been aligned, means coupled to the mouse for optically scanning the printed character with which the mouse is aligned and providing electrical signals which describe the scanned character as a bit map, a printer which produces visual images on an output medium by selective actuation of elements arranged in a matrix, and means responsive to the electrical signals for actuating the elements in the matrix in accordance with the bit map to form an image of the selected character.

2. The typewriter of claim 1 wherein the means for optically scanning the selected character comprises a charge coupled device having a plurality of light sensitive elements arranged in a two dimensional array positioned to receive light from the character with which the mouse is aligned.

3. The typewriter of claim 1 wherein the means for optically scanning the selected character comprises a linear array of light sensors and means for effecting scanning of the selected character by array of light sensors.

4. The typewriter of claim 3 wherein the light sensors comprise optical fibers.

5. The typewriter of claim 1 wherein the printer is a bubble jet printer.

6. The typewriter of claim 1 including a calligraphy pad positioned in proximity to the keyboard panel and having an area in which any desired character can be formed, means for optically scanning the character on the calligraphy pad and providing electrical signals which describe that character as a bit map, and means responsive to the last named electrical signals for actuating the elements in the matrix to form an image of the character on the calligraphy pad.

7. The typewriter of claim 6 wherein the means for optically scanning the character on the calligraphy pad comprises a charge coupled device having a plurality of light sensitive elements arranged in a two dimensional array, and means for positioning the charged coupled device to receive light from the character on the calligraphy pad.

8. The typewriter of claim 6 wherein the means for optically scanning the character on the calligraphy pad comprises a linear array of light sensors and means for scanning the array of light sensors across the character on the calligraphy pad.

9. The typewriter of claim 8 wherein the light sensors for scanning the character on the calligraphy pad comprise optical fibers.

10. The typewriter of claim 6 wherein the means for optically scanning the selected character on the keyboard panel and the means for scanning the character on the calligraphy pad utilize a common optical sensor and means for selectively positioning the common sensor for receiving light from either the character on the keyboard panel or the character on the calligraphy pad.

11. The typewriter of claim 1 including a magnetic storage medium positioned beneath the keyboard panel, with information associated with the characters on the keyboard panel stored on the magnetic medium, and means for transducing the information for the selected character from the magnetic medium.

12. In a typewriter: a keyboard panel having a plurality of characters printed thereon in optically readable form, a mouse movable about the keyboard panel and having means for visually aligning the mouse with a selected one of the printed characters, means coupled to the mouse for optically scanning the printed character with which the mouse is aligned and providing electrical signals which describe the scanned character as a bit map, a printer which produces visual images on an output medium by selective actuation of elements arranged in a matrix, means responsive to the electrical signals for actuating the elements in the matrix in accordance with the bit map to form an image of the selected character, a magnetic storage medium positioned beneath the keyboard panel with information associated with the characters on the keyboard panel recorded on the magnetic medium in tracks arranged in a herringbone pattern with the information in each one of the tracks being recorded with an orientation perpendicular to that of the information in the tracks adjacent thereto to prevent crosstalk between the information in adjacent tracks, and means comprising a pair of heads for transducing the information for the selected character in alternate ones of the tracks.

13. In a typewriter: a keyboard panel having a plurality of characters printed thereon in optically readable form, a mouse movable about the keyboard panel and having means for visually aligning the mouse with a selected one of the printed characters, means for holding the mouse in a fixed position relative to the character with which it has been aligned, optical sensing means coupled to the mouse for reading the printed character with which the mouse is aligned and providing electrical signals corresponding to that character printer means for forming visual images on an output medium, and means responsive to the electrical signals for conditioning the printer means to form an image of the character with which the mouse is aligned.

14. The typewriter of claim 13 including a calligraphy pad positioned in proximity to the keyboard panel and having an area in which any desired character can be formed, optical sensing means for reading the character on the calligraphy pad and providing electrical signals corresponding thereto, and means responsive to the last named electrical signals for conditioning the printer means to form an image of the character on the calligraphy pad.

15. The typewriter of claim 14 wherein the optical sensing means for reading the characters on the keyboard panel and on the calligraphy pad utilize a common optical sensor and means for selectively positioning the common sensor for receiving light from either the selected character on the keyboard panel or the character on the calligraphy pad.

16. The typewriter of claim 13 including a magnetic storage medium positioned beneath the keyboard panel, with information associated with the characters on the keyboard panel stored on the magnetic medium, and means for transducing the information for the selected character from the magnetic medium as the character is read on the keyboard panel.

17. In a typewriter: a keyboard panel having a plurality of characters printed thereon in optically readable form, a mouse movable about the keyboard panel and having means for visually aligning the mouse with a selected one of the printed characters, optical sensing means coupled to the mouse for reading the printed character with which the mouse is aligned and providing electrical signals corresponding to that character, printer means for forming visual images on an output medium, means responsive to the electrical signals for conditioning the printer means to form an image of the character with which the mouse is aligned, a magnetic storage medium positioned beneath the keyboard panel with information associated with the characters on the keyboard panel recorded on the magnetic medium in tracks arranged in a herringbone pattern, with the information in each one of the tracks being recorded with an orientation perpendicular to that of the information in the tracks adjacent thereto to prevent crosstalk between the information in adjacent tracks, and means comprising a pair of heads for reading the information in alternate ones of the tracks.

18. In a self-contained portable typewriting unit: a case, a keyboard panel mounted on the case and having a plurality of characters printed thereon in optically readable form, a mouse movable about the keyboard panel and having means for visually aligning the mouse with a selected one of the characters, means for holding the mouse in a fixed position relative to the character with which it has been aligned, means coupled to the mouse for optically scanning the selected character and providing electrical signals which describe the character as a bit map, a printer mounted in the case and forming an integral part of the unit for producing visual images on an output medium by selective actuation of elements arranged in a matrix, and means responsive to the electrical signals for actuating the elements in the matrix in accordance with the bit map to form an image of the character with which the mouse is aligned.

19. In a typewriter: a generally rectangular keyboard panel having an array of characters printed thereon in optically readable form, a mouse movable relative to the keyboard panel and having a magnifying lens through which the characters can be viewed to align the mouse with a selected one of the printed characters, means for holding the mouse in a fixed position relative to the character with which it has been aligned, optical scanning means carried by the mouse for scanning the character with which the mouse is aligned and providing electrical signals which describe that character, a printer, and means responsive to the electrical signals for actuating the printer to form an image of the character with which the mouse is aligned.

20. The typewriter of claim 19 wherein the keyboard panel comprises a base, an overlay removably mounted on the base and having the characters printed thereon at predetermined locations, and registration means carried by the base for holding the overlay in a predetermined position on the base, and the typewriter further includes detent means operative between the mouse and the base for releasably holding the mouse in alignment with the predetermined locations when the overlay is mounted on the base.

21. The typewriter of claim 19 including a second mouse disposed beneath the keyboard panel for movement with the first named mouse, and a light source carried by the second mouse for passing light through the keyboard panel to illuminate the character with which the first named mouse is aligned.

22. The typewriter of claim 19 including a second mouse disposed beneath the keyboard panel for movement in concert with the first named mouse, a magnetic recording medium positioned beneath the keyboard panel and having information associated with the characters on the keyboard panel recorded thereon in magnetically readable form, and means carried by the second mouse for transducing the information from the magnetic medium for the character with which the first named mouse is aligned.

23. The typewriter of claim 19 wherein the optical scanning means comprises a charge coupled device having a plurality of light sensitive elements arranged in a two dimensional array.

24. The typewriter of claim 19 wherein the optical scanning means comprises a linear array of light sensors and means for effecting scanning of the character with which the mouse is aligned by the array of light sensors.

25. The typewriter of claim 24 wherein the light sensors comprise optical fibers.

26. In a typewriter: a generally rectangular keyboard panel comprising a transparent overlay having an array of characters printed thereon in optically readable form and a translucent underlay having areas of color aligned in registration with predetermined groups of characters on the overlay, a mouse movable relative to the keyboard panel and having a magnifying lens through which the characters can be viewed to align the mouse with a selected one of the printed characters, optical scanning means carried by the mouse for scanning the character with which the mouse is aligned and providing electrical signals which describe that character as a bit map, a matrix-type printer, and means responsive to the electrical signals for actuating the printer in accordance with the bit map to form an image of the character with which the mouse is aligned.

27. In a typewriter: a generally rectangular keyboard panel having an array of characters printed thereon in optically readable form, a mouse movable relative to the keyboard panel and having a magnifying lens through which the characters can be viewed to align the mouse with a selected one of the printed characters, optical scanning means carried by the mouse for scanning the character with which the mouse is aligned and providing electrical signals which describe that character as a bit map, a matrix-type printer, means responsive to the electrical signals for actuating the printer in accordance with the bit map to form an image of the character with which the mouse is aligned, a second mouse disposed beneath the keyboard panel for movement in concert with the first named mouse, a magnetic recording medium positioned beneath the keyboard panel and having information associated with the characters on the keyboard panel recorded thereon in magnetically readable form in tracks arranged in a herringbone pattern, with the information in each one of the tracks being recorded with an orientation perpendicular to that of the information in the tracks adjacent thereto to prevent crosstalk between the information in adjacent tracks, and means comprising a pair of heads carried by the second mouse for reading the information in alternate ones of the tracks for the character with which the first named mouse is aligned.

28. In a typewriter:

a keyboard panel having a plurality of characters printed thereon in optically readable form;

a mouse movable about the keyboard panel and having means for visually aligning the mouse with a selected one of the characters;

means coupled to the mouse for optically reading the character with which the mouse is aligned and providing electrical signals corresponding thereto;

a calligraphy pad positioned in close proximity to the keyboard panel and having a writing area in which a character can be manually written, and means for optically scanning the writing area and providing electrical signals corresponding to a character written in said area;

a printer; and means responsive to the electrical signals for actuating the printer to form an image of a single character selected on the keyboard panel or a character written in the writing area of the calligraphy pad.

29. In a typewriter:

a keyboard panel having a plurality of characters printed thereon in optically readable form;

a mouse movable about the keyboard panel and having means for visually aligning the mouse with a selected one of the characters;

means coupled to the mouse for optically reading the character with which the mouse is aligned and providing electrical signals corresponding thereto;

a calligraphy pad positioned in close proximity to the keyboard panel and having a writing area in which a character can be manually written, a light transmissive window in the writing area, a light source positioned beneath the window, a tape, and means for feeding the tape across the upper side of the window to bring successive areas of the tape into registration with the window so that new characters can be written thereon, and means for optically scanning the writing area and providing electrical signals corresponding to a character written on the tape;

a printer; and means responsive to the electrical signals for actuating the printer to form an image of a single character selected on the keyboard panel or a character written in the writing area of the calligraphy pad.

30. In a typewriter: a generally rectangular keyboard panel having an array of characters printed thereon in optically readable form, an upper mouse movable relative to the keyboard panel and having means for visually aligning the upper mouse with individual ones of the printed characters, optical scanning means carried by the upper mouse for scanning a character with which the upper mouse is aligned and providing electrical signals descriptive of said character, a second mouse disposed beneath the keyboard panel for movement in concert with the upper mouse, a light source carried by the second mouse for passing light through the keyboard panel to illuminate the character with which the upper mouse is aligned, a writing area in proximity to the keyboard panel in which a character can be manually written, optical scanning means for providing electrical signals descriptive of a character written in the writing area, a printer, and means responsive to the electrical signals for actuating the printer to form an image of a character with which the upper mouse is aligned or a character written in the writing area.

31. The typewriter of claim 30 including a magnetic recording medium positioned beneath the keyboard panel and having information associated with the characters on the keyboard panel recorded thereon in magnetically readable form in tracks arranged in a herringbone pattern, and a pair of heads carried by the lower mouse for transducing the information in alternate ones of the tracks, the information in each one of the tracks being recorded with an orientation perpendicular to that of the information in the tracks adjacent thereto to prevent crosstalk between the information in adjacent tracks.

32. The typewriter of claim 30 wherein the writing area includes a light transmissive window, a tape, means for feeding the tape past the window to bring successive areas of the tape into registration with the window, and a light source for directing light toward the window to illuminate the area of the tape in registration with the window so that the optical scanning means can read a character written in that area.

33. The typewriter of claim 30 wherein at least one of the optical scanning means comprises a charge coupled device having a plurality of light sensitive elements arranged in a two dimensional array.

34. The typewriter of claim 30 wherein at least one of the optical scanning means comprises a linear array of light sensors and means for effecting scanning of a character by the array of light sensors.

35. In a typewriting method utilizing a keyboard panel having a plurality of characters printed thereon in optically readable form, the steps of: visually positioning a mouse in alignment with a selected one of the printed characters, temporarily locking the mouse in a fixed position relative to the selected character, optically scanning the printed character with which the mouse is aligned and providing electrical signals which describe the scanned character as a bit map, and actuating a matrix printer in accordance with the bit map to form an image of the character with which the mouse is aligned.

36. The typewriting method of claim 35 wherein the step of optically scanning the selected character includes scanning the character with a charge coupled device having a plurality of light sensitive elements arranged in a two dimensional array.

37. The typewriting method of claim 35 wherein the step of optically scanning the selected character includes scanning the character with a linear array of light sensors.

38. The typewriting method of claim 37 including the steps of holding the light sensors in a stationary position and scanning the character by successively directing light from different portions of the character to the sensors.

39. The typewriting method of claim 35 including the steps of forming an additional character on a calligraphy pad positioned in proximity to the keyboard panel, optically scanning the additional character and providing electrical signals which describe that character as a bit map, and actuating the printer in accordance with the last named bit map to form an image of the additional character.

40. The typewriting method of claim 39 wherein the step of optically scanning the additional character includes scanning the additional character with a charge coupled device having a plurality of light sensitive elements arranged in a two dimensional array.

41. The typewriting method of claim 39 wherein the step of optically scanning the additional character includes scanning the additional character with a linear array of light sensors.

42. The typewriting method of claim 41 including the steps of holding the light sensors in a stationary position and scanning the character on the calligraphy pad by successively directing light from different portions of the character to the sensors.

43. The typewriting method of claim 39 wherein the steps of scanning the character on the keyboard panel and scanning the character on the calligraphy pad include scanning said characters with a common optical sensor.

44. The typewriting method of claim 35 including the steps of storing information associated with the characters on the keyboard panel on a magnetic storage medium positioned beneath the keyboard panel, and transducing the information for the selected character from the magnetic medium as the character is scanned on the keyboard panel.

45. In a typewriting method utilizing a keyboard panel having a plurality of characters printed thereon in optically readable form, the steps of: recording information associated with the characters on the keyboard in tracks arranged in a herringbone pattern on a magnetic medium positioned beneath the keyboard, with the information in each one of the tracks being recorded with an orientation perpendicular to that of the information in the tracks adjacent thereto to prevent crosstalk between the information in adjacent tracks, optically scanning a selected one of the printed characters and providing electrical signals which describe the scanned character as a bit map, actuating a matrix printer in accordance with the bit map to form an image of the selected character, and transducing the information for the selected character from the magnetic medium as the character is scanned on the keyboard panel utilizing different heads to transduce the information in adjacent ones of the tracks.

46. In a typewriting method, the steps of: imprinting a plurality of characters on a keyboard panel in optically readable form, visually positioning a mouse in alignment with a selected one of the printed characters, temporarily locking the mouse in a predetermined fixed position relative to the selected character, optically reading the printed character with which the mouse is aligned and providing electrical signals corresponding thereto, and printing a visual image of the selected character in accordance with the electrical signals.

47. The typewriting method of claim 46 including the steps of forming an additional character on a calligraphy pad positioned in proximity to the keyboard panel, optically scanning the additional character and providing electrical signals corresponding thereto, and printing a visual image of the additional character in accordance with the electrical signals corresponding to that character.

48. The typewriting method of claim 47 wherein the steps of reading the character and scanning the additional character include scanning said characters with a common optical sensor.

49. The typewriting method of claim 46 including the steps of storing information associated with the characters on the keyboard panel on a magnetic storage medium positioned beneath the keyboard panel, and transducing the information for the selected character from the magnetic medium.

50. In a typewriting method, the steps of: imprinting a plurality of characters on a keyboard panel in optically readable form, recording information associated with the characters on the keyboard panel in tracks arranged in a herringbone pattern on a magnetic medium positioned beneath the keyboard panel, with the information in each one of the tracks being recorded with an orientation perpendicular to that of the information in the tracks adjacent thereto to prevent crosstalk between the information in adjacent tracks, optically reading a selected one of the printed characters and providing electrical signals corresponding thereto, printing a visual image of the selected character in accordance with the electrical signals, and transducing the information for the selected character from the magnetic medium as the printed character is read from the keyboard panel utilizing different heads to transduce the information in adjacent ones of the tracks.

51. In a typewriting method, the steps of: providing a generally rectangular keyboard panel having an array of characters imprinted thereon in optically readable form, moving a mouse relative to the keyboard panel into visual alignment with a selected one of the printed characters, temporarily locking the mouse in a predetermined fixed position relative to the selected character, scanning the character with which the mouse is aligned with an opto-electric transducer carried at least in part by the mouse to provide electrical signals which describe the character, and actuating a printer in accordance with the electrical signals to form an image of the selected character.

52. The typewriting method of claim 51 wherein the keyboard panel is provided by printing the characters in predetermined positions on an overlay and placing the overlay on a base having registration pins which engage the overlay and retain it in a predetermined position, and the mouse is guided into proper alignment with a selected character on the overlay by engaging a detent between the mouse and the base.

53. The typewriting method of claim 51 including the steps of moving a second mouse beneath the keyboard panel in concert with the first named mouse, and passing light from a source carried by the second mouse through the keyboard panel to illuminate the selected character.

54. The typewriting method of claim 51 including the steps of moving a second mouse beneath the keyboard panel in concert with the first named mouse, and transcribing information associated with the characters from a magnetic medium positioned beneath the keyboard panel with a transducer carried by the second mouse.

55. In a typewriting method, the steps of: providing a generally rectangular keyboard panel having a transparent overlay with an array of characters imprinted thereon in optically readable form and positioned over a translucent underlay having areas of color in registration with predetermined groups of characters on the overlay, moving a mouse relative to the keyboard panel into visual alignment with a selected one of the printed characters, scanning the character with which the mouse is aligned with an opto-electric transducer carried at least in part by the mouse to provide electrical signals which describe the character as a bit map, and actuating a matrix-type printer in accordance with the bit map to form an image of the selected character.

56. In a typewriting method, the steps of: providing a generally rectangular keyboard panel having an array of characters imprinted thereon in optically readable form, moving a mouse relative to the keyboard panel into visual alignment with a selected one of the printed characters, scanning the character with which the mouse is aligned with an opto-electric transducer carried at least in part by the mouse to provide electrical signals which describe the character as a bit map, and actuating a matrix-type printer in accordance with the bit map to form an image of the selected character, moving a second mouse beneath the keyboard panel in concert with the first named mouse, and transcribing information associated with the characters from a magnetic medium positioned beneath the keyboard panel with a transducer carried by the second mouse, the information being recorded in tracks arranged in a herringbone pattern on the magnetic medium, with the information in each one of the tracks being recorded with an orientation perpendicular to that of the information in the tracks adjacent thereto to prevent crosstalk between the information in adjacent tracks.

57. In a typewriting method, the steps of: providing a keyboard panel having a plurality of characters printed thereon in optically readable form, visually aligning a mouse with one of the characters, optically reading the printed character on the keyboard panel with which the mouse is aligned and providing electrical signals corresponding that character, actuating a printer in accordance with the electrical signals to form an image of the selected character on an output medium, manually writing an additional character on a calligraphy pad positioned in close proximity to the keyboard panel, optically scanning the additional character and providing electrical signals corresponding thereto, and actuating the printer in accordance with the last named electrical signals to form an image of the additional character on the output medium.

58. In a typewriting method, the steps of: providing a keyboard panel having a plurality of characters printed thereon in optically readable form, visually aligning a mouse with one of the characters, optically reading the printed character on the keyboard panel with which the mouse is aligned and providing electrical signals corresponding that character, actuating a printer in accordance with the electrical signals to form an image of the selected character on an output medium, manually writing an additional character on a tape on a calligraphy pad positioned in close proximity to the keyboard panel, advancing the tape across a transparent window on the pad to bring the character written on the tape into registration with the window, directing light toward the window to illuminate the character in registration with the window, optically scanning the additional character and providing electrical signals corresponding thereto, and actuating the printer in accordance with the last named electrical signals to form an image of the additional character on the output medium.

59. In a typewriting method, the steps of: providing a generally rectangular keyboard panel having an array of characters printed thereon in optically readable form, moving, an upper mouse relative to the keyboard panel into visual alignment with a selected one of the printed characters, scanning the character with which the upper mouse is aligned with an opto-electric transducer carried at least in part by the upper mouse to provide electrical signals descriptive of the selected character, moving a second mouse beneath the keyboard panel in concert with the upper mouse, passing light from a source carried by the second mouse through the keyboard panel to illuminate the character, manually writing an additional character on a calligraphy pad positioned in close proximity to the keyboard panel, optically scanning the additional character and providing electrical signals corresponding thereto, and actuating a printer in accordance with the electrical signals to form images of the selected character and the additional character on an output medium.

60. In a typewriter: a keyboard panel having an array of characters printed thereon in visually readable form, an upper mouse movable relative to the keyboard panel and having means for visually aligning the upper mouse with individual ones of the printed characters, a lower mouse disposed beneath the keyboard panel for movement in concert with the upper mouse, optical scanning means carried by one of the mice for providing electrical signals descriptive of the character with which the upper mouse is aligned, a printer, and means responsive to the electrical signals for actuating the printer to form an image of a character with which the upper mouse is aligned.

* * * * *